March 25, 1958  G. A. LYON  2,828,159
WHEEL COVER
Filed Feb. 19, 1954
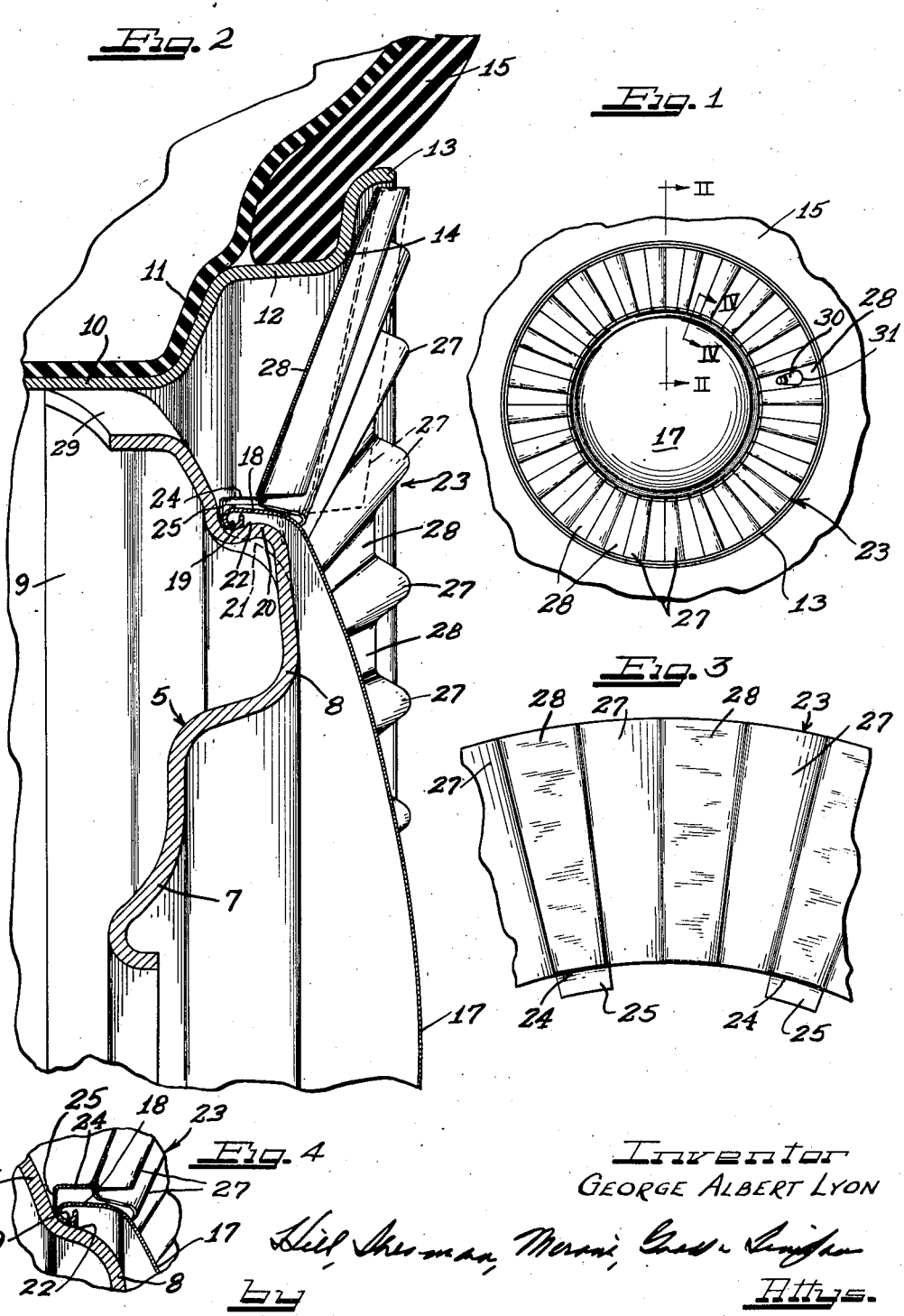
Inventor
GEORGE ALBERT LYON

United States Patent Office 2,828,159
Patented Mar. 25, 1958

2,828,159

WHEEL COVER

George Albert Lyon, Detroit, Mich.

Application February 19, 1954, Serial No. 411,310

6 Claims. (Cl. 301—37)

The present invention relates to improvements in wheel structures and more particularly concerns the ornamental and protective covering of the outer sides of vehicle wheels.

An important object of the present invention is to provide an improved wheel structure having a wheel cover for the outer side thereof affording a generally spoke-like appearance.

Another object of the invention is to provide an improved combination hub cap and trim ring arrangement for a vehicle wheel.

A further object of the invention is to provide an improved trim ring adapted to be maintained under resilient tension on a wheel by a hub cap applied to the outer side of the wheel.

Still another object of the invention is to provide a novel trim ring for the outer side of vehicle wheels, the trim ring having both axially and circumferentially resilient characteristics.

Other objects, features and advantages of the present invention will be readily apparent from the following detailed description of a preferred embodiment thereof taken in conjunction with the accompanying drawing in which:

Figure 1 is an outer side elevational view of a vehicle wheel embodying features of the invention;

Figure 2 is an enlarged fragmentary radial sectional view taken substantially on the line II—II of Figure 1;

Figure 3 is a fragmentary plan view of the trim ring of the cover assembly for the wheel; and Figure 4 is a fragmentary radial sectional elevational view taken substantially on the line IV—IV of Figure 1.

The present invention is especially adapted for a wheel embodying features covered in my Patent No. 2,445,330 issued July 20, 1948, including an especially desirable retaining bump arrangement for retaining a hub cap on the wheel. To this end the wheel comprises a wheel body 5 having a central dished bolt on flange 7 by which the wheel is adapted to be attached to an axle part of a vehicle. The wheel body 5 is of the disk spider type including an annular axially outwardly extending nose bulge 8 and a peripheral axially inwardly directed attachment flange 9 by which the wheel body is attached to a base flange 10 of a tire rim. The tire rim is of the drop center multi-flange type having a side flange 11 extending axially and radially outwardly from the base flange and merging with a generally axially outwardly and radially outwardly sloping intermediate flange 12 merging with the radially outwardly extending portion of a terminal flange 13 extending first radially outwardly and then axially outwardly and having a juncture shoulder 14 at juncture with the intermediate flange. The flanges of the tire rim are adapted to support a pneumatic tire and tube assembly 15.

A hub cap 17 of a diameter to overlie the central portion of the wheel body 5 and the nose bulge 8 has a flexible annular generally axially extending marginal flange 18 provided with a resilient under and inwardly turned bead 19 of a diameter to engage in snap-on pry-off relation with a series of generally radially outwardly directed retaining bumps 20 on the radially outer side of the nose bulge 18 and projecting radially beyond an annular generally radially outwardly facing shoulder 21 on the nose bulge. Each of the retaining bumps 20 has a generally radially outwardly and axially inwardly facing sloping retaining shoulder 22 which is engaged by the retaining bead 19 of the hub cap and stretches the bead generally radially outwardly at the retaining shoulders 22 while the intermediate portions of the bead draw generally radially inwardly against the shoulder 21 substantially as seen in Fig. 4. The oblique surface of the shoulders 22 causes the bead 19 to draw generally axially inwardly and thereby causes at least those portions of the bead intermediate the retaining bumps to bottom against the wheel body adjacent to the shoulder 21 as seen in Fig. 4.

For disposition opposite the tire rim and the adjacent portion of the wheel body 5 radially outwardly of the hub cap 17, a novel trim ring 23 is provided. The trim ring comprises an annulus of an outside diameter to lie opposite the shoulder 14 of the tire rim and inside the tip of the terminal flange 13, and of an inside diameter to lie adjacent to the side wall 18 of the hub cap.

For retaining the trim ring 23 on the wheel, it is provided at its inner margin with a suitable series of angular retaining fingers 24 comprising elongated axially inwardly directed extensions from the inner edge of the trim ring and provided with radially inwardly directed terminal flange portions 25 extending inwardly to a diameter less than the outside diameter of the hub cap side wall 18 so as to underlie the retaining bead 19 of the hub cap. Thereby the finger flanges 25 are adapted to be clamped against the wheel body by the bead 19. In order to clear the portions of the bead 19 that engage the retaining bumps 20, the fingers 24 are preferably spaced circumferentially to lie at the opposite sides of the bumps 20 and thereby be engaged by the portions of the bead 19 that bottom against the wheel body.

In order to afford a generally spoke-like appearance for the trim ring 23, and also to render the same resiliently flexible in axial as well as circumferential direction, the trim ring is made from a flexible sheet material such as stainless steel or the like and is corrugated along radial lines to provide a spaced series of radially extending ridges 27 alternating with grooved portions 28. In a preferred form the ribs 27 are of arcuately arched form while the grooves are defined by substantially flat areas. It will be observed that the retaining fingers 24 extend from certain of the flat groove areas 28.

Normally the trim ring 23 has the inner margin thereof contracted to the extent that the trim ring is substantially flat or extends only slightly obliquely axially and radially inwardly, substantially as shown in dash outline in Fig. 2. Hence when the trim ring is applied to the outer side of the wheel, the outer margin of the trim ring will engage against the terminal flange and the inner margin will be spaced substantially axially outwardly from the wheel body. Then by applying the marginal bead 19 of the hub cap 17 to the finger terminal flanges 25 and pressing the hub cap inwardly, the inner margin of the trim ring is caused to move axially inwardly and thereby flex the trim ring 23 inwardly while the outer margin fulcrums on the tire rim shoulder 14. As an incident to the axially inward deflection of the trim ring, the corrugations are enabled to expand slightly as the inner margin of the trim ring tilts uniformly inwardly toward the wheel body. This places the trim ring uniformly under resilient tension whereby it is held against the wheel in a rattle-free condition.

Since the outer ends of the ribs 27 open radially outwardly, air circulation passages are provided thereby from behind the trim ring to promote circulation of air through wheel openings 29 in the operation of the wheel in service.

In order to accommodate a valve stem 30, one of the groove portions 28 of the trim ring is provided with a valve stem aperture 31.

It will be understood that modifications and variations may be effected without departing from the scope of the novel concepts of the present invention.

I claim as my invention:

1. In a wheel structure including a tire rim and a wheel body with a hub cap on the wheel body, an annular trim ring of resilient sheet material engageable at its radially outer portion with the tire rim and having a series of generally radially extending spoke-like rib corrugations opening through the inner margin of the trim ring and in a normal unassembled condition maintaining the trim ring body in a predetermined axially outward relationship of the inner margin to the radially outer portion, and a series of inwardly directed retaining fingers projecting from the inner margin of the trim ring and engageable behind the hub cap to draw the inner margin of the trim ring axially inwardly relative to the outer portion of the trim ring fulcrumed on the tire rim, said corrugations being flexibly contractable as an incident to resilient deflection of the inner margin of the trim ring relative to the outer portion by engagement of the retaining fingers behind the hub cap on the wheel body, the inner ends of the corrugations being disposed adjacent to the side wall of the hub cap so as to appear to emanate therefrom.

2. In a wheel structure including a tire rim and a wheel body having thereon a hub cap provided with a generally axially extending side wall portion and a turned edge portion for bottoming against the wheel body, a trim ring for disposition at the outer side of the wheel dimensioned to overlie the tire rim and the wheel body radially outwardly from the hub cap, said trim ring having rib corrugations opening through the inner edge of the trim ring and axially inwardly elongated retaining fingers provided with radially inwardly directed terminals engageable under the edge portion of the hub cap for retaining the trim ring on the wheel, the axially elongated fingers maintaining the trim ring with the inner ends of the corrugations disposed adjacent to the side wall of the hub cap so as to appear to emanate therefrom.

3. In a wheel structure including a tire rim and a wheel body with a hub cap supported on the wheel body, a trim ring for disposition at the outer side of the wheel in substantially covering relation to the tire rim and the wheel body radially outwardly from the hub cap, the trim ring having an inner edge arranged to lie adjacent to the side of the hub cap and provided with a series of generally L-shaped retaining fingers having axially inwardly extending legs provided with radially inwardly directed terminals for engagement with the hub cap and maintaining the inner margin of the trim ring substantially spaced from the wheel body, and with the inner edge of the trim ring being disposed adjacent to the adjacent portion of the side wall of the hub cap so as to appear to emanate therefrom spaced from the body-engaging portion of the hub cap.

4. In a wheel structure including a wheel body and a multi-flange tire rim supported thereby and providing an annular outer side shoulder thereon, cover means for disposition at the outer side of the wheel including a circular portion for overlying the outer side of the tire rim and the adjacent portion of the wheel body, said circular cover portion being generally radially ribbed and axially flexible, the outer end portions of the cover ribs being engageable in fulcruming relation with said rim shoulder, and means whereby the cover portion adjacent the inner ends of said ribs is drawn flexibly deflectably axially inwardly with the outer end portions of the ribs tensionably fulcrumed on said rim shoulder and with said means retaining the cover portion in the wheel covering fulcrumed inwardly tensionably deflected relation.

5. In a wheel structure including a wheel body and a multi-flange tire rim supported thereby and providing an annular outer side shoulder thereon, cover means for disposition at the outer side of the wheel including a circular portion for overlying the outer side of the tire rim and the adjacent portion of the wheel body, said circular cover portion being generally radially ribbed and axially flexible, the outer end portions of the cover ribs being engageable in fulcruming relation with said rim shoulder, and means whereby the cover portion adjacent the inner ends of said ribs is drawn flexibly deflectably axially inwardly with the outer end portions of the ribs tensionably fulcrumed on said rim shoulder and with said means retaining the cover portion in the wheel covering fulcrumed inwardly tensionably deflected relation, said means including a central cover member separably related to said circular cover portion and with the inner ends of the ribs appearing in the assembly to emanate from the central cover member.

6. In a wheel structure including a wheel body and a multi-flange tire rim supported thereby and providing an annular outer side shoulder thereon, with air circulation openings adjacent juncture of the wheel body and tire rim, cover means for disposition at the outer side of the wheel including a circular portion for overlying the outer side of the tire rim and the adjacent portion of the wheel body, said circular cover portion being generally radially ribbed and axially flexible, the outer end portions of the cover ribs being engageable in fulcruming relation with said rim shoulder, and means whereby the cover portion adjacent the inner ends of said ribs is drawn flexibly deflectably axially inwardly with the outer end portions of the ribs tensionably fulcrumed on said rim shoulder and with said means retaining the cover portion in the wheel covering fulcrumed inwardly tensionably deflected relation, said ribs providing at the axially inner side of said cover portion air circulation passages in conjunction with the tire rim shoulder to promote air circulation through the wheel openings in the operation of the wheel in service.

References Cited in the file of this patent

UNITED STATES PATENTS

| | | |
|---|---|---|
| D. 168,313 | Lyon | Dec. 2, 1952 |
| 2,279,330 | Lyon | Apr. 14, 1942 |
| 2,356,310 | Gass | Aug. 22, 1944 |
| 2,422,689 | Lyon | June 24, 1947 |
| 2,504,995 | Lyon | Apr. 25, 1950 |
| 2,544,702 | Lyon | Mar. 13, 1951 |
| 2,544,703 | Lyon | Mar. 13, 1951 |
| 2,639,948 | Grimshaw | May 26, 1953 |